(12) United States Patent
Morikawa et al.

(10) Patent No.: US 8,081,322 B2
(45) Date of Patent: Dec. 20, 2011

(54) IMAGE FORMING APPARATUS, JOB SETTING SUPPORT METHOD, AND JOB SETTING SUPPORT PROGRAM

(75) Inventors: Takeshi Morikawa, Takarazuka (JP); Minako Kobayashi, Ikeda (JP); Kei Shigehisa, Amagasaki (JP); Nobuo Kamei, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 107 days.

(21) Appl. No.: 11/594,725

(22) Filed: Nov. 9, 2006

(65) Prior Publication Data
US 2007/0250535 A1 Oct. 25, 2007

(30) Foreign Application Priority Data

Apr. 19, 2006 (JP) ................. 2006-116045

(51) Int. Cl.
*G06F 3/12* (2006.01)
(52) U.S. Cl. .......... 358/1.1; 358/1.9; 709/205; 715/700; 707/609
(58) Field of Classification Search .............. 358/1.1, 358/1.5; 709/205; 715/700; 707/609
See application file for complete search history.

(56) References Cited

U.S. PATENT DOCUMENTS

| 6,786,149 | B1 | 9/2004 | Lomoine et al. | |
| 6,847,466 | B1 * | 1/2005 | Gazdik et al. | 358/1.15 |
| 7,195,408 | B2 * | 3/2007 | Nishiguchi | 400/76 |
| 2003/0095269 | A1 * | 5/2003 | Kubo et al. | 358/1.9 |
| 2005/0146731 | A1 | 7/2005 | Mitani | |
| 2006/0023244 | A1 * | 2/2006 | Mitsui | 358/1.13 |

FOREIGN PATENT DOCUMENTS

| JP | 10-171307 | 6/1998 |
| JP | 2000-235466 | 8/2000 |
| JP | 2001-243031 | 9/2001 |
| JP | 2004-54432 | 2/2004 |
| JP | 2004-306609 | 11/2004 |
| JP | 2005-31982 | 2/2005 |
| JP | 2005-196734 | 7/2005 |

OTHER PUBLICATIONS

Japanese Office Action directed towards counterpart application No. 2006-116045; 5 pages.
Japanese Interrogation mailed Apr. 6, 2010, directed to Japanese counterpart application No. 2006-116045; 6 pages.

* cited by examiner

*Primary Examiner* — Don Wong
*Assistant Examiner* — Tuan-Khanh Phan
(74) *Attorney, Agent, or Firm* — Morrison & Foerster LLP (57) ABSTRACT

The image forming apparatus of the present invention includes a storage unit storing therein a database that contains a plurality of setting value strings of executed jobs. Here, each setting value string (i) indicates a setting condition used in a corresponding executed job, and (ii) includes setting values, each of which is associated with a different one of setting items and indicates a setting mode of the associated setting item. When a reception unit receives a setting value for a new job from a user, a search unit searches the database for a setting value string related to the received setting value. A display control unit displays the setting value string found by the search unit on a screen.

19 Claims, 11 Drawing Sheets

| FUNCTIONAL CATEGORY | SETTING ITEM | DEFAULT | MODE 1 | MODE 2 |
|---|---|---|---|---|
| FINISHING | SORT | UNSET | SORTING | — |
|  | STAPLE | UNSET | CORNER | 2 POINTS |
|  | PUNCH | UNSET | PUNCHING | — |
| SAVING | DOUBLE-SIDED COPY | UNSET | DOUBLE-SIDED COPY | — |
|  | ZOOM RATIO | UNSET | 0.707 | 0.500 |
|  | COMBINING COPY | UNSET | 2 IN 1 | 4 IN 1 |
| APPLICATION | BOOKLET | UNSET | BOOKLET | — |
|  | NUMBERING | UNSET | NUMBERING | — |

| EXECUTED JOB NUMBER | DB CONTENT | COUNT—PAST 1 MONTH |
|---|---|---|
| 1 | 11001100 | 12 |
| 2 | 11001101 | 6 |
| ... | ... | ... |

| | | | | |
|---|---|---|---|---|
| | RECOMMENDED SETTING | 1/5 | | |
| FINISHING | SORT | SORTING | CONFIRM | 192 |
| | STAPLE | CORNER | | |
| | PUNCH | UNSET | | |
| SAVING | DOUBLE-SIDED COPY | UNSET | NEXT | 193 |
| | ZOOM RATIO | 0.707 | | |
| | COMBINING COPY | 2 IN 1 | | |
| APPLICATION | BOOKLET | UNSET | RETURN | 194 |
| | NUMBERING | NUMBERING | | |

| FINISHING SETTING | RECOMMENDED SETTING 0/0 |

SORT | STAPLE | PUNCH | RETURN

UNSET / SORTING | UNSET / CORNER | UNSET / PUNCHING | 2 POINTS

FIG. 15B

| FINISHING SETTING | RECOMMENDED SETTING 1/5 |

SORT | STAPLE | PUNCH | RETURN

UNSET / SORTING | UNSET / CORNER | UNSET / PUNCHING | 2 POINTS

| | | |
|---|---|---|
| FINISHING | SORT | SORTING |
| | STAPLE | CORNER |
| | PUNCH | UNSET |
| SAVING | DOUBLE-SIDED COPY | UNSET |
| | ZOOM RATIO | 0.707 |
| | COMBINED COPY | 2 IN 1 |
| APPLICATION | BOOKLET | UNSET |
| | NUMBERING | NUMBERING |

CONFIRM | NEXT | RETURN

FIG. 15C

| FINISHING SETTING | RECOMMENDED SETTING 1/3 |

SORT | STAPLE | PUNCH | RETURN

UNSET / SORTING | UNSET / CORNER | UNSET / PUNCHING | 2 POINTS

| | | |
|---|---|---|
| FINISHING | SORT | SORTING |
| | STAPLE | 2 POINTS |
| | PUNCH | UNSET |
| SAVING | DOUBLE-SIDED COPY | UNSET |
| | ZOOM RATIO | 1.000 |
| | COMBINED COPY | UNSET |
| APPLICATION | BOOKLET | UNSET |
| | NUMBERING | NUMBERING |

CONFIRM | NEXT | RETURN

FIG. 16

IMAGE FORMING APPARATUS, JOB SETTING SUPPORT METHOD, AND JOB SETTING SUPPORT PROGRAM

BACKGROUND OF THE INVENTION

This application claims priority under 35 U.S.C. 119 from Japanese Patent Application No. 2006-116045 filed Apr. 19, 2006, the content of which is hereby incorporated by reference.

(1) Field of the Invention

This invention relates to an image forming apparatus and technology for facilitating the user to specify job settings involving various functions with simple operation.

(2) Related Art

A MFP (Multi Function Peripheral), which is an image forming apparatus, is a complex machine having functions of scanning, copying, printing, faxing and the like.

The multifunctionality of such a complex machine has been evolving. For example, functions related to copying include sorting, stapling, punching, double-sided copying, combining copying (2 in 1, for example), and zoom ratio setting.

Although the use of such multifunctions is convenient, it requires a setting corresponding to each function in return, which leads to cumbersome procedures for job settings.

The Japanese Laid-Open Patent Application No. H10-171307 discloses a structure that prestores data in which setting items have already been set, as modes for image formation, and allows the user to call the image forming modes if desired. The patent reference claims that the structure enhances operability.

However, the technology of the above patent reference still has a operability problem since it exercises management of the data only by attaching a storing number to each already-set image forming mode, and therefore the user has to select a desired mode from various image forming modes which are displayed in a list in response to the user's call.

In addition, the above technology requires special operation to call a prestored image forming mode, and is not adequate to especially a beginning user who is inexperienced with the operation of the image forming apparatus.

Additionally, the above-mentioned convenient functions of the image forming apparatus end up not being used effectively if job setting operations are difficult.

SUMMARY OF THE INVENTION

The present invention has been made in view of the problems above, and aims at offering an image forming apparatus which allows even a beginning user, especially inexperienced with such operations, to specify job settings using various functions provided by the image forming apparatus.

In order to achieve the above object, the present invention is an image forming apparatus comprising: a storage unit storing therein a database that contains a plurality of setting value strings of executed jobs, each setting value string (i) indicating a setting condition used in a corresponding executed job, and (ii) including setting values, each of which is associated with a different one of setting items and indicates a setting mode of the associated setting item; a reception unit operable to receive a setting value for a new job from a user; a search unit operable to search the database for a setting value string related to the received setting value; and a display control unit operable to display the setting value string found by the search unit on a screen as a candidate setting condition for the new job. The present invention is also a job setting support method using a database that contains a plurality of setting value strings of executed jobs, each setting value string (i) indicating a setting condition used in a corresponding executed job, and (ii) including setting values, each of which is associated with a different one of setting items and indicates a setting mode of the associated setting item. The job setting support method comprises the steps of: (a) receiving a setting value for a new job from a user; (b) searching the database for a setting value string related to the received setting value; and (c) displaying the setting value string found in the step (b) on a screen as a candidate setting condition for the new job. Furthermore, the present invention is a job setting support program using a database that contains a plurality of setting value strings of executed jobs, each setting value string (i) indicating a setting condition used in a corresponding executed job and (ii) including setting values, each of which is associated with a different one of setting items and indicates a setting mode of the associated setting item, and causing a computer to execute the steps of: (a) receiving a setting value for a new job from a user; (b) searching the database for a setting value string related to the received setting value; and (c) displaying the setting value string found in the step (b) on a screen as a candidate setting condition for the new job.

According to these image forming apparatus, job setting support method and job setting support program, the setting value string displayed by the display control unit can be used for a new job. Therefore, the present invention is capable of supporting a beginning user, especially inexperienced with the operation, in readily making settings for a job using various functions.

In addition, it is often the case that an image forming apparatus used in an office or the like is shared by multiple users, and the users tend to have similar usage patterns. Therefore, according to the above structures, for example, a user is able to imitate a setting condition of a job executed by a person at the office by simply selecting one from candidate setting conditions displayed on the screen. That is, the use of convenient functions provided with the apparatus can be disseminated among the users sharing the same image forming apparatus.

Here, the search unit may search a setting value string including a setting value matching the received setting value. In addition, the step (b) may search a setting value string including a setting value matching the received setting value.

Before the reception of the setting value from the user, a setting value string, each of whose setting values is set to default, may be assigned to the new job, and the search unit may start the search when the received setting value is a value other than the default. In addition, before the reception of the setting value from the user, a setting value string, each of whose setting values is set to default, may be assigned to the new job, and the step (b) may start the search when the received setting value is a value other than the default.

According to the structure, users specifying a setting condition using values other than the default values are considered as having an intention to use various functions, and it is possible to increase usability of the users by adequately displaying the found candidate setting conditions.

The setting items may include a setting item related to post-processing performed on paper on which an image is formed, and the search unit may start the search when the received setting value is a value associated with the setting item related to the post-processing. In addition, the setting items may include a setting item related to post-processing performed on paper on which an image is formed, and the step (b) may start the search when the received setting value is a value associated with the setting item related to the post-processing.

Post-processing conducted on paper after printing—e.g. stapling, punching, and sorting—is convenient functions that the image forming apparatus can provide, however, the post-processing functions tend not to be used by beginning users since they do not know the existence of such functions or hesitate to use those functions. However, the above structures facilitate settings for post-processing and it is possible to disseminate the use among the users.

The reception unit may receive the setting value from the user via a receiving screen displayed by the display control unit. Here, the reception of the setting value causes the search unit to start the search, and in the case when the search unit finds the setting value string, the display control unit updates the receiving screen to display the found setting value string. In addition, the step (a) may receive the setting value from the user via a receiving screen. Here, the step (b) starts the search in response to the reception of the setting value, and in the case when the step (b) finds the setting value string, the step (c) updates the receiving screen to display the found setting value string.

According to the above structures, candidate setting conditions can be presented to the user interactively by updating the receiving screen, which leads to an improvement of user interface.

The setting items may include a setting item related to a functional characteristic of image formation.

The image forming apparatus above may further comprise: a connection unit operable to connect the image forming apparatus, via a network, to a different image forming apparatus including a storage unit storing therein a database matching the database of the image forming apparatus; and a synchronous updating unit operable to synchronously update the database of the image forming apparatus with the database of the different image forming apparatus. In addition, the database may be stored in a storage unit of an image forming apparatus, and the job setting support method above may further comprise: (d) connecting the image forming apparatus, via a network, to a different image forming apparatus including a storage unit storing therein a database matching the database of the image forming apparatus; and (e) synchronously updating the database of the image forming apparatus with the database of the different image forming apparatus.

According to the structure, the database of the image forming apparatus can be enriched by synchronously updating it with the database of another image forming apparatus.

Each of the plurality of setting value strings contained in the database may be associated with a search ranking thereof. Then, in the case when the search unit finds two or more setting value strings related to the received setting value, the display control unit preferentially displays one of the found setting value strings, the search ranking of which is highest. In addition, each of the plurality of setting value strings contained in the database may be associated with a search ranking thereof. Then, in the case when the step (b) finds two or more setting value strings related to the received setting value, the step (c) preferentially displays one of the found setting value strings, the search ranking of which is highest.

According to the structure, it is possible to facilitate the selection from the found setting conditions of executed jobs.

The display control unit may display a screen divided into a first display area and a second display area. Here, the first display area includes a receiving screen for receiving the setting value for the new job from the user, and the second display area shows the setting value string found by the search unit as the candidate setting condition for the new job. In addition, the step (c) may display a screen divided into a first display area and a second display area. Here, the first display area includes a receiving screen for receiving the setting value for the new job from the user, and the second display area shows the setting value string found by the step (b) as the candidate setting condition for the new job.

BRIEF DESCRIPTION OF THE DRAWINGS

These and other objects, advantages and features of the invention will become apparent from the following description thereof taken in conjunction with the accompanying drawings which illustrate specific embodiments of the invention.

In the drawings.

DETAILED DESCRIPTION OF THE INVENTION

The best modes for implementing the present invention are described next with the aid of drawings.

Embodiment 1

Figure 1:
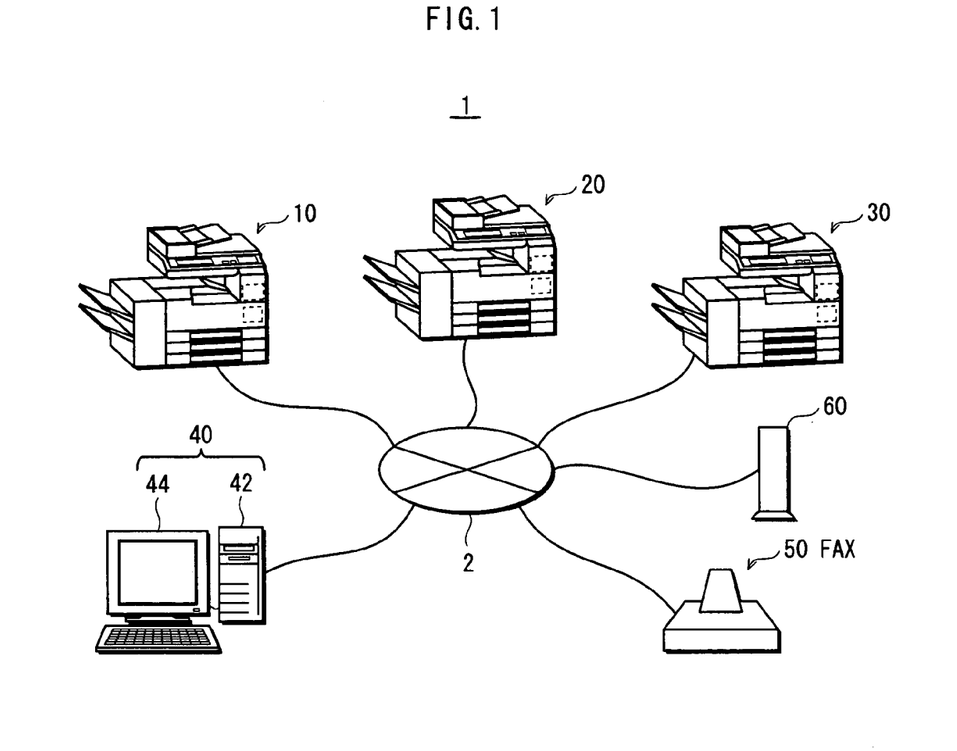
FIG. 1 shows a structure of a network image forming system 1 according to Embodiment 1.

FIG. 1 shows a structure of a network image forming system 1 according to Embodiment 1.

The network image forming system 1 includes an MFP 10, an MFP 20, an MFP 30, a PC 40, a FAX terminal 50, and a NAS 60, and these apparatuses are connected to one another via a LAN 2.

In addition, the name resolution of each apparatus has been carried out by a DNS server (not shown), and, for example, the PC 40 has been assigned with a computer name of "PC001" as the identification information.

The PC (personal computer) 40 comprises a PC body 42 and a liquid crystal monitor 44. On the PC body 42, printer drivers for controlling operations of the MFPs and FAX terminal 50 and other applications are installed.

The FAX terminal 50 has been assigned with a telephone number of a land line or an IP phone.

The NAS (Network Attached Storage) 60 is a data storage device used by being connected to a network, and can be used as a file server.

Figure 2:
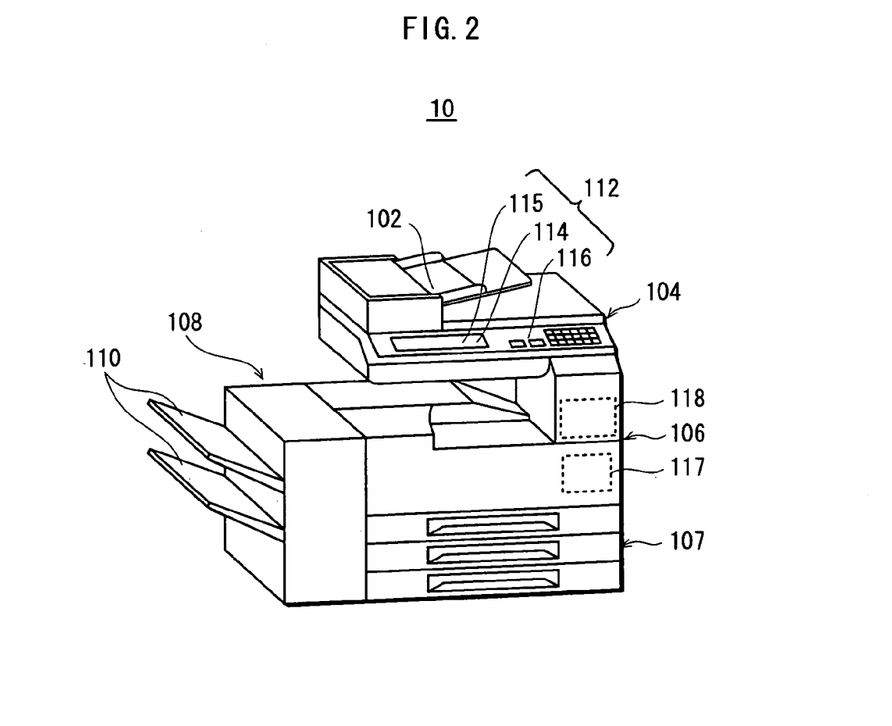
FIG. 2 is a perspective view showing the exterior appearance of an MFP 10.

FIG. 2 is a perspective view showing the exterior appearance of the MFP 10. Note that, since the MFPs 10, 20 and 30 have the same structure, only the MFP 10 is described here as a representative.

The MFP 10, which is an image forming apparatus, is an apparatus into which functions of copying, network printing, scanning, faxing, document serving and the like are combined.

The MFP 10 includes a document feeder 102, a scanner subunit 104, a printer subunit 106, a paper feeding subunit 107, a finisher (post-processing subunit) 108, an exit tray 110, an operation panel subunit 112, a communication subunit 117, a storage subunit 118.

The document feeder 102 feeds an original laid on a tray.

The scanner subunit 104 reads the original and generates image data. The generated image data (a) becomes a printing target of the printer subunit 106, (b) is used in the data transmission via the communication subunit 117, and (c) is stored in the storage subunit 118 for later use.

The printer subunit 106 prints image data on paper. Paper is fed from the paper feeding subunit 107.

The finisher 108 performs post-processing on printed paper such as stapling and punching, and subsequently ejects the paper to the exit tray 110.

The control panel subunit 112 includes: a display 114 for displaying, for example, notification to the user, screens on which the user specifies setting entries, and progress of a job executed on the MFP 10; a touch panel 115 integrated with the display 114; and push button keys 116 for inputting numbers and the like.

The communication subunit 117 is formed with, for example, a NIC (Network Interface Card) and a modem, and exchanges data with external devices.

The storage subunit 118 is formed with a HDD and stores therein various data. Instead of the HDD, recording media, such as a Compact Flash™ and Smart Media, and a readable and writable card reader/writer may be used.

Figure 3:
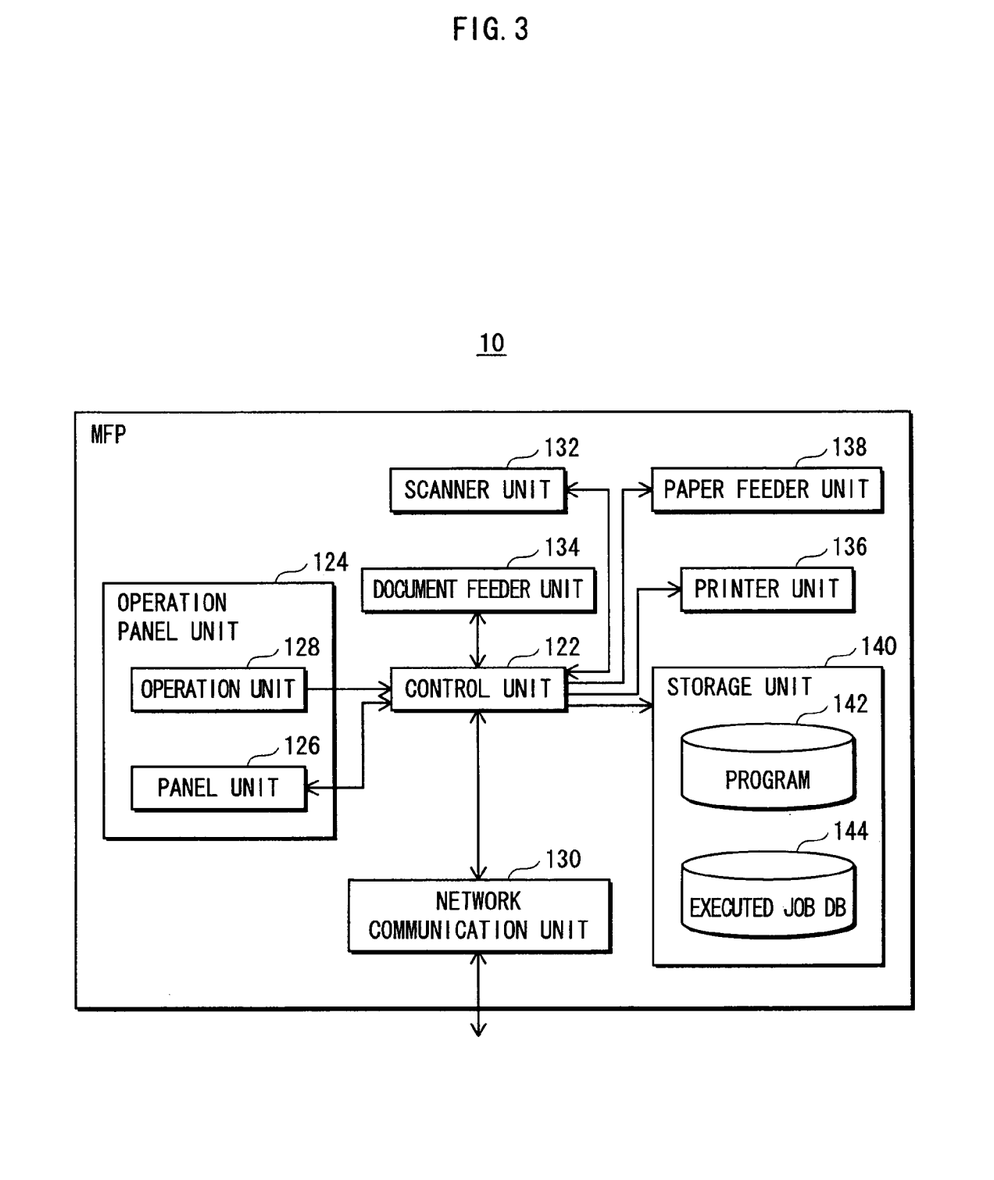
FIG. 3 is a functional block diagram showing a structure of the MFP 10.

FIG. 3 is a functional block diagram showing a structure of the MFP 10.

The MFP 10 includes a control unit 122, an operation panel unit 124, a network communication unit 130, a scanner unit 132, a document feeder unit 134, a printer unit 136, a paper feeder unit 138, and a storage unit 140.

The control unit 122 comprises hardware such as a CPU, a RAM and a ROM, and comprehensively controls operations of the MFP 10 including control of display on the operation panel unit 124.

The operation panel unit 124 comprises: a panel unit 126 including the display 114; and an operation unit 128 including the touch panel 115 and button keys 116, and realizes a user interface function.

The network communication unit 130 including the communication subunit 117 is a function block for handling network communication.

The scanner unit 132 including the scanner subunit 104 generates image data.

The document feeder unit 134 has a function of feeding an original laid on a tray of the document feeder 102.

The printer unit 136 including the printer subunit 106 prints image data on paper.

The paper feeder unit 138 including the paper feeding subunit 107 feeds paper used for printing.

The storage unit 140 including the storage subunit 118 stores therein image data, a job setting support program 142, and executed job DB (Database) 144.

The executed job DB 144 is a database in which multiple setting items set in executed jobs (i.e. jobs executed on the MFP 10 in past times) and a value indicating a mode used for each of the setting items are organized. The detail is described hereinafter with the aid of FIG. 6.

Figure 4:
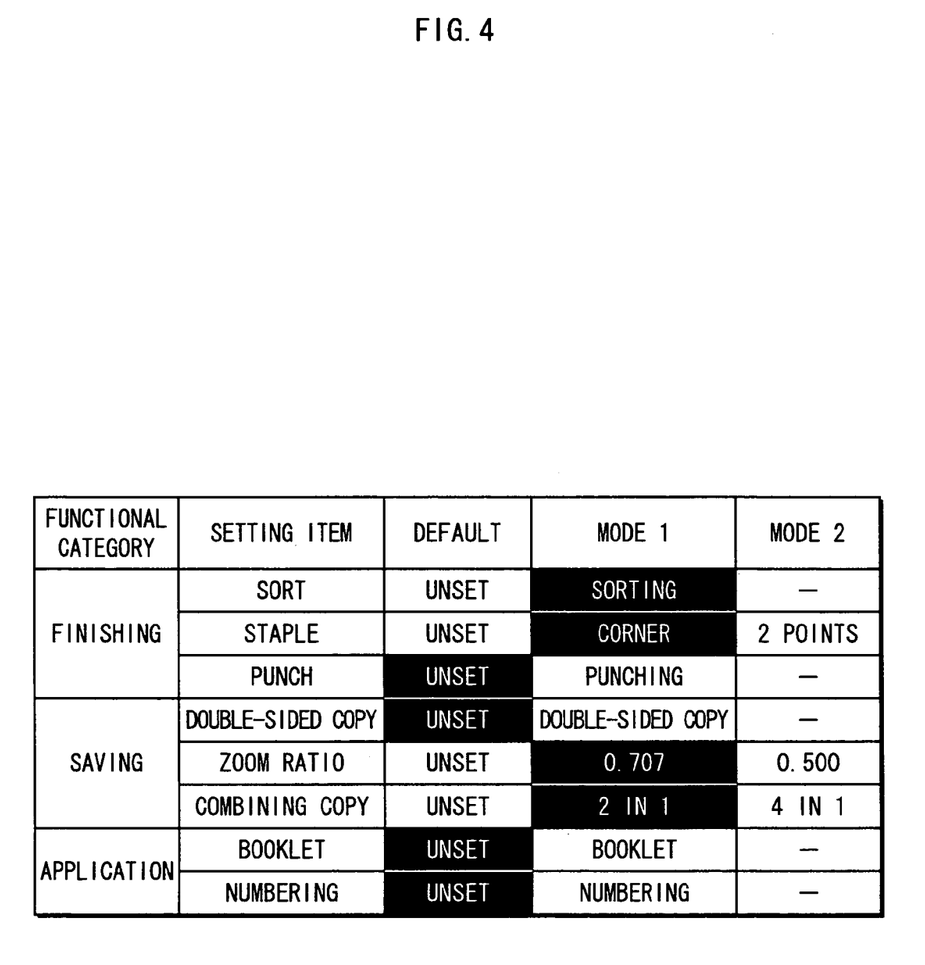
FIG. 4 is a table showing a list of mode settings for copying.

FIG. 4 is a table showing a list of settings for copy modes.

As shown in FIG. 4, there are three functional categories: "finishing"; "saving"; and "application", and there are eight setting items related to functions: "sort"; "staple"; "punch"; "double-sided copy"; "zoom"; "combining copy"; "booklet"; and "numbering". As to these eight items, their default settings are "unset".

"Finishing" is related to post-processing for paper after copying is complete, and includes the setting items of "sort", "staple" and "punch".

"Sort" is a setting item for automatically sorting multiple sheets of copied paper for each set.

"Staple" is a setting item for stapling sheets of copied paper, and has two settings of "corner" for stapling one corner of the paper and "2 positions" for stapling the paper at two points.

"Punch" is a setting item for punching a filing hole on copied paper.

"Saving" is for realizing a function of reducing the use of copying paper, and includes the setting items of "double-sided copy", "zoom ratio", and "combining copy".

"Combining copy" is a setting item for combining multiple pages of original images and copying them on a single sheet, and includes settings of "2 in 1" and "4 in 1", which 2 and 4 pages of original images, respectively, are combined onto one sheet of paper.

"Application" includes the setting items of "booklet" and "numbering".

"Booklet" is a setting item for deciding a binding position and copying multiple originals to make a booklet.

"Numbering" is a setting item for assigning page numbers to sheets of copied paper.

To each of these setting items, a default set value (=0) and a set value corresponding to Mode 1 (=1) are provided. For some setting items, a set value corresponding to Mode 2 (=2) is further provided.

The following describes a process in which executed job data is stored in the executed job DB and a data structure of the executed job data stored therein.

Figure 5:
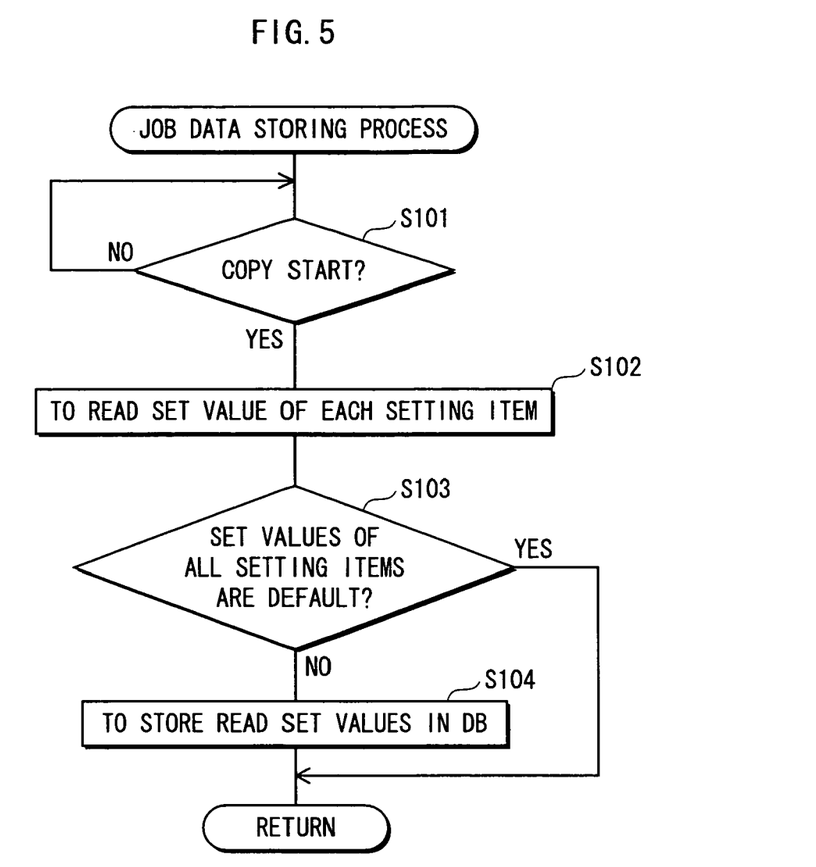
FIG. 5 is a flowchart showing a job data storing process.

FIG. 5 is a flowchart showing a job data storing process carried out by the control unit 122. Note that the job data storing process is a subroutine of a setting support process for a new job, to be hereinafter described with the aid of FIG. 11.

When determining a start of copying (S101: Yes), the control unit 122 reads set values of the individual setting items (S102).

In the example shown in FIG. 4, the mode of "sort" is "sorting", the mode of "staple" is "corner", the mode of "punch" mode is "unset", the mode of "double-sided copy" is "unset", the mode of "zoom ratio" is "0.707", the mode of "combining copy" is "2 in 1", the mode of "booklet" is "unset", and the mode of "numbering" is "unset", and therefore, a group of the set values corresponding to all the setting items is "11001100". This eight-digit number made up of set values is referred to as a setting value string hereinafter.

Then, the control unit 122 judges whether the setting value string is default (S103).

If the setting value string is default (i.e. "00000000") (S103: Yes), there is little point in making a database of it, and therefore the control unit 122 does not store the setting value string in a database and returns to the main routine of FIG. 11 to be hereinafter described.

If the setting value string is not default (S103: No), the control unit 122 stores the setting value string in a database (S104). In the case where the same setting value string already exists in the database, the count is incremented, or alternatively, the setting value string may not be stored therein from the second time onward.

Figure 6:
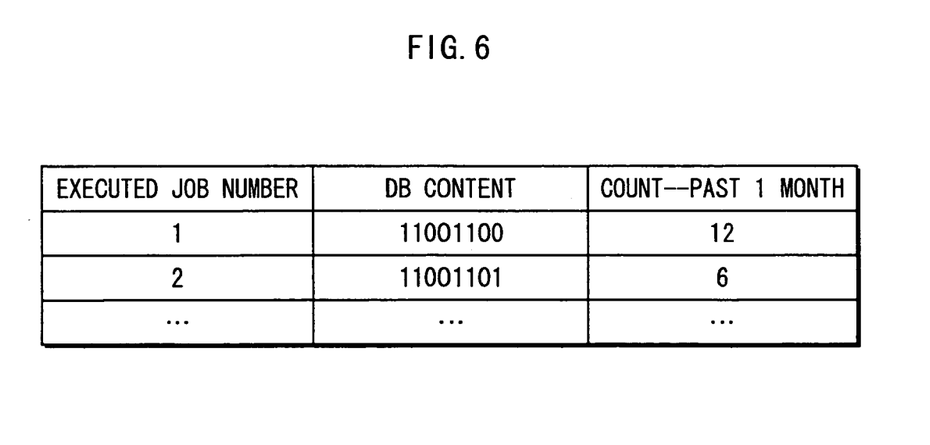
FIG. 6 is a table simply showing a data structure of an executed job DB.

FIG. 6 is a table simply showing a data structure of the executed job DB.

As shown in FIG. 6, the executed job DB is a database in which setting items and set values of the respective setting items are sorted for each executed job, and includes items of "executed job number", "DB content", and "count—past 1 month".

An eight-digit number in the "DB content" corresponds to a set of eight set values. Here, a job condition specified with this set of eight set values is referred to as a setting condition.

The "count—past 1 month" is the number of jobs executed with the setting condition for the past 1 month.

Figure 7:
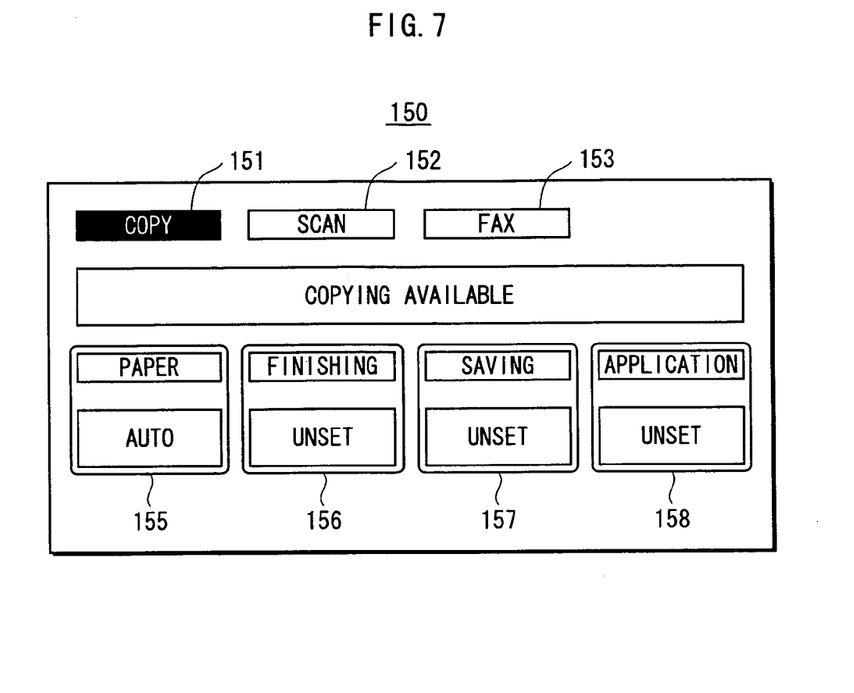
FIG. 7 shows an initial receiving screen 150 for new job's settings, appearing on the display 114.

FIG. 7 shows an initial receiving screen 150 for new job's settings, appearing on the display 114.

Since the display 114 is a touch panel display, as described above, individual keys 151-153 and 155-158 on the initial receiving screen 150 can be selected by touch.

As shown in FIG. 7, a "COPY" key 151, a "SCAN" key 152, and a "FAX" key 153 are displayed on the initial receiving screen 150, and these keys 151 to 153 can be selected by touch.

Additionally, in the initial receiving screen 150, a "PAPER" key 155, a "FINISHING" key 156, a "SAVING" key 157 and an "APPLICATION" key 158 are also displayed.

When the selection of the "PAPER" key 155 is received, the display 114 updates to show a screen for receiving a paper size selection from among A4, A3 and the like (not shown).

Figure 8:
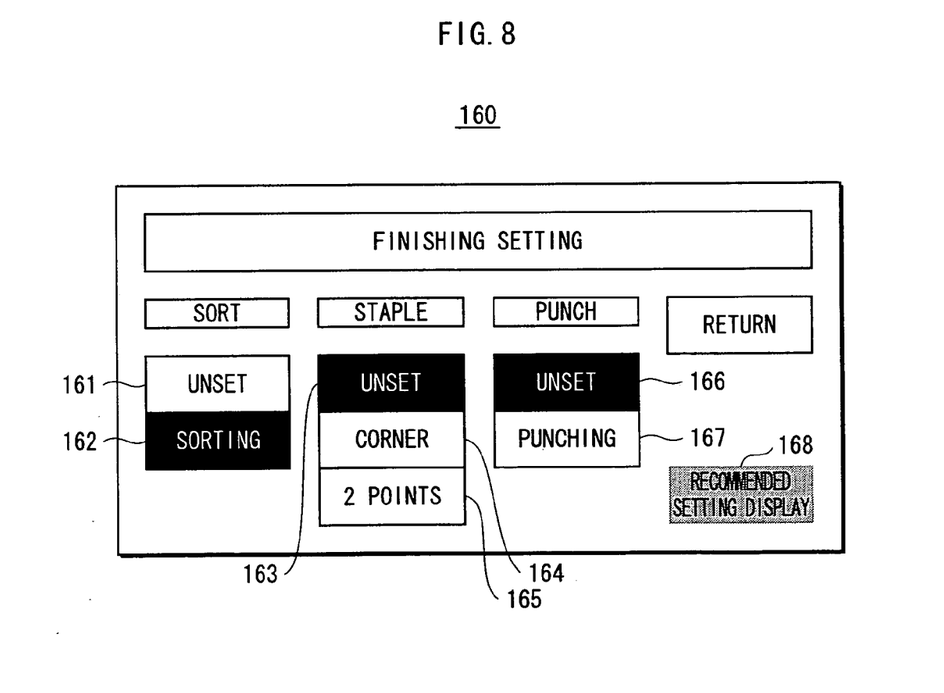
FIG. 8 shows a receiving screen 160 for a finishing setting condition.

When the selection of the "FINISHING" key 156 is received, the display 114 updates to show a finishing-setting receiving screen 160 shown in FIG. 8.

Figure 9:
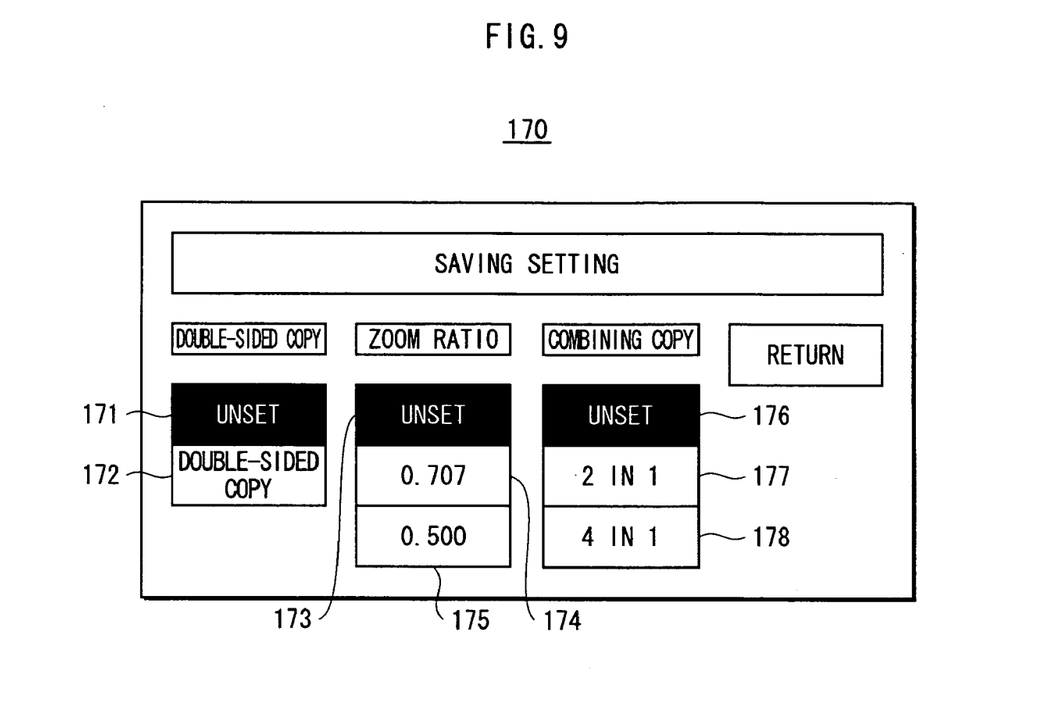
FIG. 9 shows a receiving screen 170 for a saving setting condition.

When the selection of the "SAVING" key 157 is received, the display 114 updates to show a saving-setting receiving screen 170 shown in FIG. 9.

Figure 10:
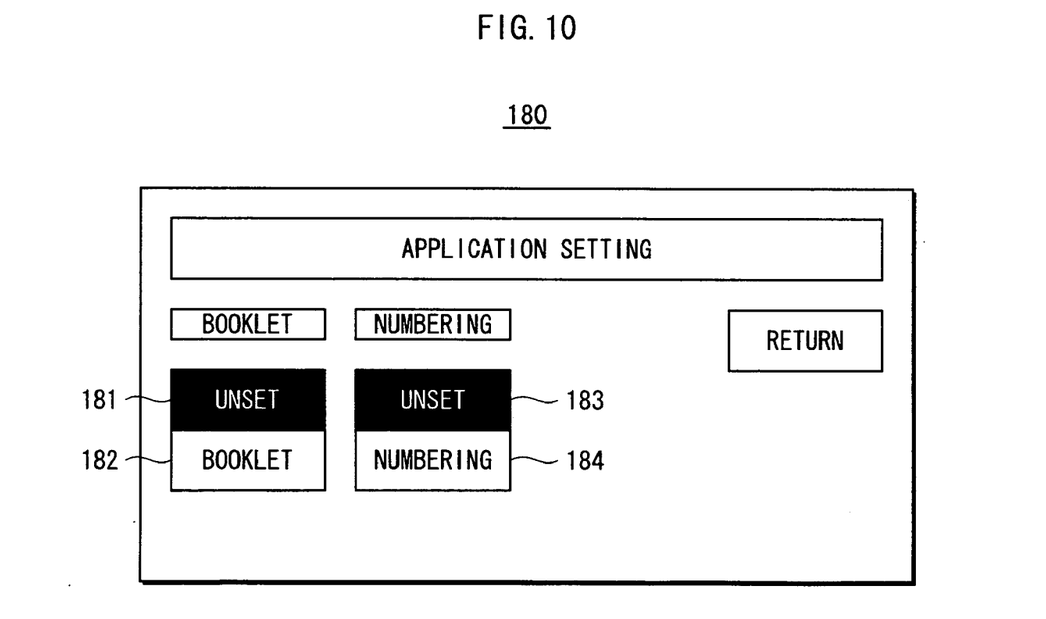
FIG. 10 shows a receiving screen 180 for an application setting condition.

When the selection of the "APPLICATION" key 158 is received, the display 114 updates to show an application-setting receiving screen 180 shown in FIG. 10.

The set values for the individual setting items can be selected or changed by making selections on the keys 161 to 167, keys 171 to 177, and keys 181 to 184 shown in FIGS. 8, 9 and 10.

Figure 11:
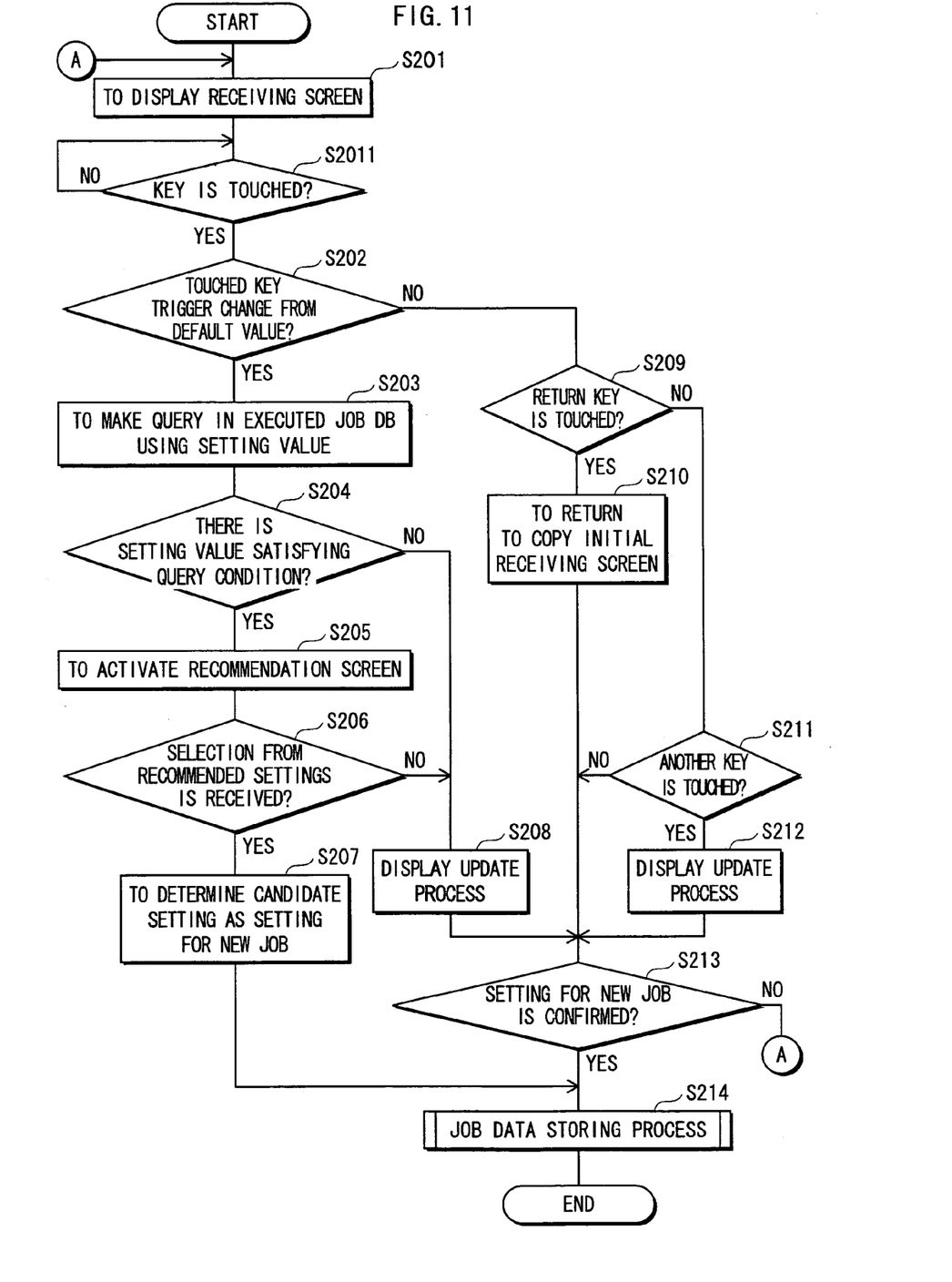
FIG. 11 is a flowchart showing a setting support process for a new job in response to entries on receiving screens.

FIG. 11 is a flowchart showing a setting support process for a new job in response to entries on a receiving screen.

First, a receiving screen is displayed (S201).

A key is touched (S2011: Yes), and if the touched key is a key for changing the default setting value string to another setting value string (S202: Yes), the control unit 122 makes a query in the executed job DB 144 using the new setting value string as a reference value (S203). For example, if a "sorting" key 162 is touched, the control unit 122 makes a query in the executed job DB 144 using a setting value string of "10000000" as a reference value to search setting value strings, at least, whose set value of the setting item "sort" indicates "sorting".

In a similar way, if a "staple: 2 points" key 165 is touched, the control unit 122 makes a query in the executed job DB 144 using a setting value string of "02000000" as a reference value to search setting value strings, at least, whose set value of the setting item "staple" indicates "2 points".

If there is a setting value string satisfying the query condition in the executed job DB 144 (S204: Yes), the control unit 122 activates a recommendation screen (S205).

Figure 12:
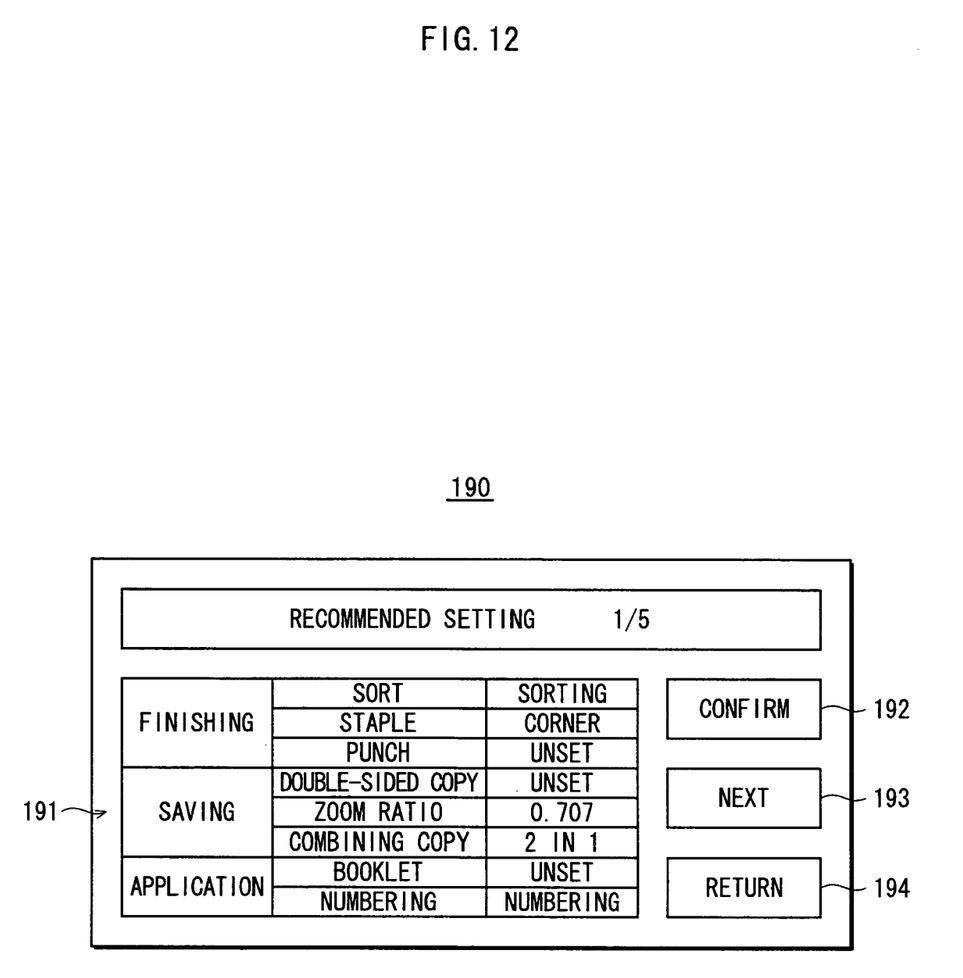
FIG. 12 shows a recommendation screen 190 displayed in Step S205.

FIG. 12 shows a recommendation screen 190 which is displayed in Step S205.

On the recommendation screen 190, a table 191 showing setting items of a retrieved executed job and a mode of each setting item is displayed as a candidate setting condition for the new job.

The table shown in FIG. 12 is an example where a setting value string that includes a set value indicating "sorting" is used in the search as a reference value, and shows one of five candidate setting conditions of previously executed jobs, retrieved after the search.

After a "next" key 193 is touched, the control unit 122 updates the recommendation screen to show the next candidate setting condition (i.e. the second search result) (not shown as a figure).

When a "confirm" key 192 is touched (S206: Yes), the control unit 122 determines the candidate setting condition as a setting condition for the new job (S207).

When a "return" key 194 is touched (S206: No), the control unit 122 moves to a display update process (S208). In the display update process, the control unit 122 updates the display to one corresponding to a key touched in S202. For example, a key touched in S202 is the "sorting" key 162, the control unit 122 updates the display to show a screen in which the "sorting" key 162 is highlighted and set in selected condition.

In Step S202, if the touched key is not a key for changing the default setting value string to another setting value string (S202: No) and is a "return" key (S209: Yes), the control unit 122 returns to the copy initial receiving screen 150.

If the touched key is not the "return" key (S209: No) and another key (e.g. a "number of copies" key, and a "reset" key) (S211: Yes), the control unit 122 carries out a display update process to update the display to show one corresponding to the touched key (S212).

When determining that the setting condition for the new job is confirmed (S213), the control unit 122 moves to a subroutine of the job data storing process.

Thus according to the present embodiment, when the user inputs, for one setting item, a set value other than the default value in the setting for a new job, the control unit 122 searches and retrieves setting value strings including a set value corresponding to a mode input by the user, and causes the display 114 of the control panel unit 112 to display, based on the retrieved setting value strings, a candidate setting condition for the new job. According to the structure, the user is able to easily retrieve setting conditions for previously executed jobs that have once been registered and thus facilitate the user to specify a setting condition for a new job, which includes various setting items.

In addition, assume that the MFP 10 is used in an office or the like and shared by multiple users. The users are able to readily use or imitate setting conditions of jobs executed by other people at the office. This is an advantage since users sharing the same MFP tend to have similar usage patterns in general.

Although knowing that the MFP 10 has convenient functions such as stapling, punching and sorting, a beginning user may tend to stay away from using these functions since they have no idea specifically which mode should be set for each setting item of the functions, or are concerned that the MFP may cause an error due to erroneous settings made by the user.

According to the present embodiment, settings used in executed jobs where convenient functions were utilized are suggested to users as "recommended settings", and thereby it is possible to encourage beginning users to adopt use of settings with convenient functions.

Note that, since allowing easy use of settings of executed jobs, the MFP 10 of the present embodiment reduces the number of key touches (keystrokes) required on the touch panel 115. This realizes a reduction in the user's operation time.

Modification 1

Although the above embodiment has a structure that automatically activates a recommendation screen when there is a setting value string satisfying the query condition (S204 and S205) as shown in FIG. 11, the screen may be displayed only in response to a request from the user.

Figure 13:
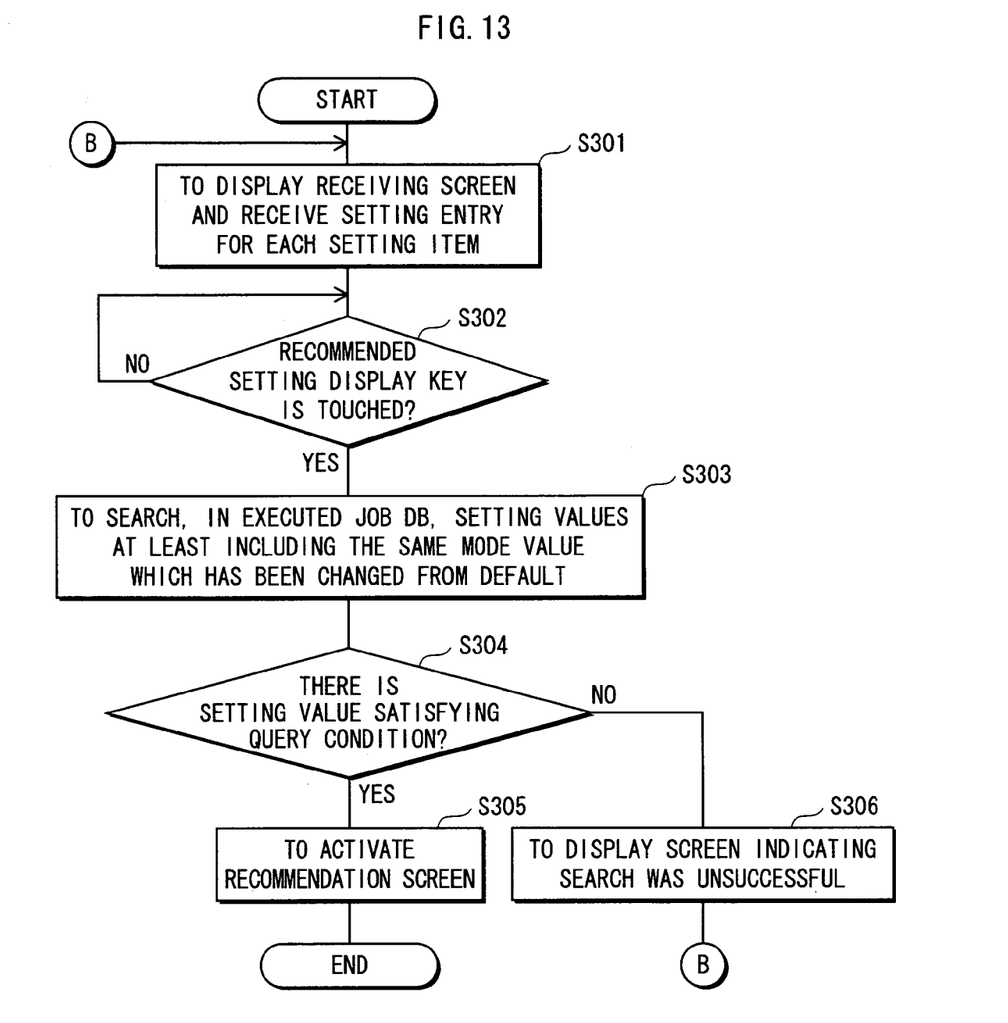
FIG. 13 is a flowchart showing a setting support process for a new job according to Modification 1.

FIG. 13 is a flowchart showing a setting support process for a new job according to Modification 1. FIG. 13 shows details of a process related to the activation of the recommendation screen only, and other processes are omitted since they are the same as those in FIG. 11.

Additionally, in Modification 1, a "recommended setting display" key 168 (refer to FIG. 8) is enabled so that the user is able to use the key.

First, the receiving screen is displayed to receive setting entries for the individual setting items (S301).

When the "recommended setting display" key 168 is touched (S302: Yes), the control unit 122 searches in the executed job DB 144 setting value strings at least including the same set value which has been changed by the user from the default (S303).

Specifically speaking, in the case where the modes of "sorting" and "corner" have been set for the setting items "sort" and "staple", respectively, at the time when the key 168 is touched, the control unit 122 makes a query using a setting value string "11000000" as a reference value to search setting value strings, at least, whose set values of the setting items "sort" and "staple" indicate "sorting" and "corner", respectively.

If there is a setting value string satisfying the query condition (S304: Yes), the control unit 122 activates a recommendation screen (refer to FIG. 12) (S305). If not (S304: No), a screen indicating that the search was unsuccessful is displayed (S306).

According to Modification 1, it is possible to improve the user interface since the recommendation screen is displayed in response to a request from the user.

Additionally, in the case when the user touches the "recommended setting display" key 168 after specifying each mode for multiple setting items, Modification 1 allows a query based on the modes for the multiple setting items. Hereby, it is possible to present more narrowed search results to the user.

Modification 2

Figure 14:
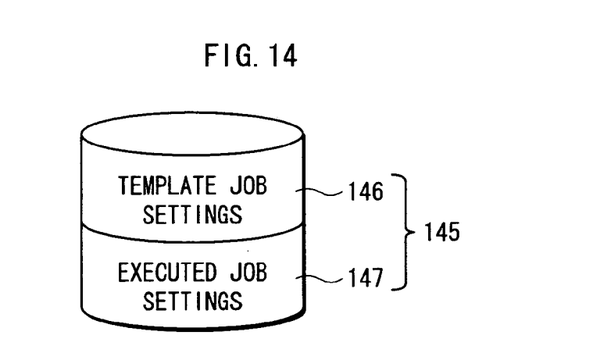
FIG. 14 shows a data structure of an existing job DB 145 according to Modification 2.

The above embodiment is explained with the executed job DB 144 which includes therein setting conditions for jobs executed on the MFP 10 in past times, however, an existing job DB 145 that includes template job setting conditions 146 in addition to executed job setting conditions 147, as shown in FIG. 14, may be used instead of the executed job DB 144.

The template job setting conditions 146 are templates for job settings, i.e. job settings in which modes of the individual setting items are set to ones that are expected to be used by the user.

Data has hardly been accumulated at the start of the use of the MFP 10, and therefore the success rate of the search is probably low with the executed job setting conditions 147 only. Therefore, by including the template job setting conditions 146 in the existing job DB 145, the database can be enriched, and hence increased usability especially at the start of the use can be expected.

Additionally, in order to enrich the executed job DB, the executed job DBs of multiple devices—MFPs 10, 20 and 30 shown in FIG. 1—may be synchronously updated at specified time intervals (for example, every 24 hours).

Modification 3

Although the above embodiment has a structure where the receiving screen and recommendation screen are separately displayed, these screens may be displayed together so as to reduce the number of times of screen switch-over and enhance the operational efficiency.

FIG. 15 shows a setting screen 200 of Modification 3 and display transition of the screen.

The setting screen 200 has two separate display areas, and the receiving screen for new job's settings is displayed in a left display area 210 and the recommendation screen is displayed in a right display area 220.

Figure 15A:
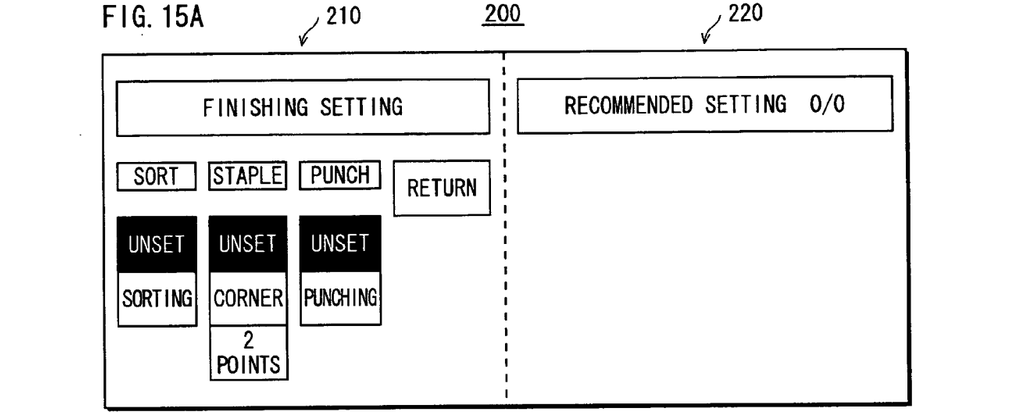
FIG. 15 shows a setting screen 200 of Modification 3 and display transitions of the screen.

In FIG. 15A, modes of the setting items regarding finishing settings in the left display area 210 are all default, and therefore no recommended setting condition is displayed in the right display area 220.

Figure 15B:
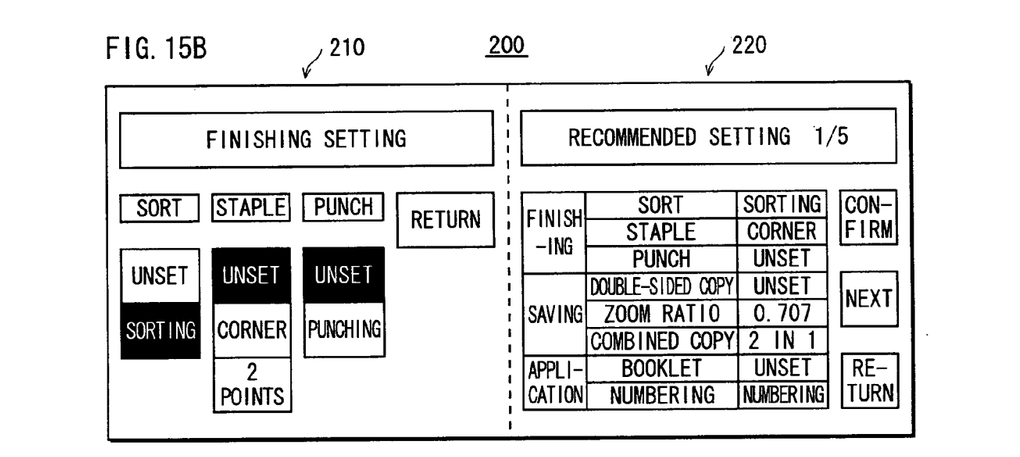

In FIG. 15B, the mode for "sort" is set to "sorting"—a mode other than the default—in the left display area 210, and subsequently a setting condition retrieved by the search using a setting value string of "10000000" as a reference value is displayed in the right display area 220 as a recommended setting condition (setting items and their modes included).

Figure 15C:
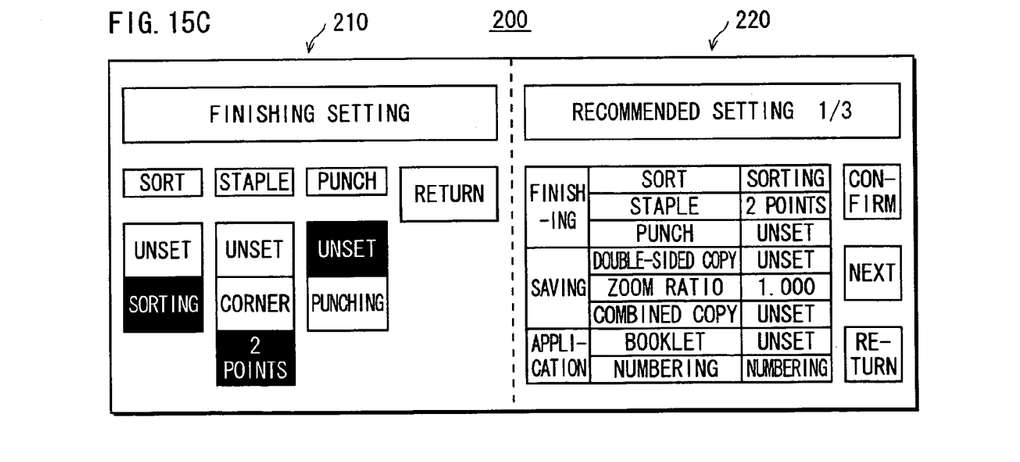

In FIG. 15C, the mode of "staple" is set to "2 points"—a mode other than the default—in the left display area 210, and subsequently a setting condition retrieved by the search using a setting value string of "12000000" as a reference value is displayed in the right display area 220 as a recommended setting condition. In FIG. 15C, since the number of setting items used for the search is increased, the search result has been narrowed, and thus the number of retrieved recommended setting conditions has been reduced to three.

According to Modification 3, recommended setting conditions can be displayed step by step in response to reception of a mode setting for each of multiple setting items, which enables a more flexible user interface.

Modification 4

The above embodiment has a structure in which a default value is assigned to each setting item, and only when a mode represented by a value other than the default value is received (refer to, for example, Step S202 in FIG. 11), a search is performed to retrieve setting value strings that include the same value. However, the present invention can be applied to the case where no default value is assigned to the setting items.

Figure 16:
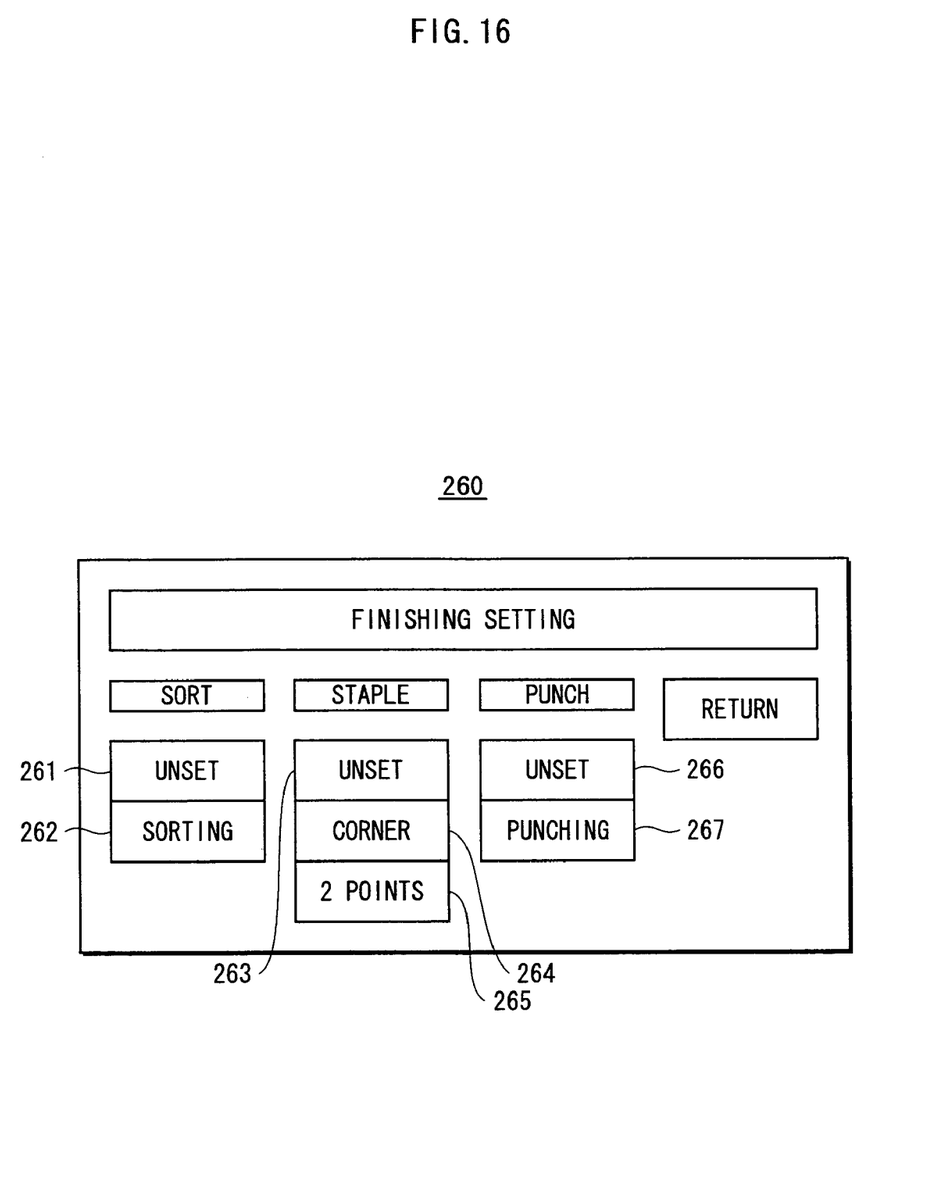
FIG. 16 shows a receiving screen 260 according to Modification 4.

FIG. 16 shows a receiving screen 260 according to Modification 4. The components in the receiving screen 260 identical to those in the receiving screen 160 of FIG. 8 are indicated with 200-number reference numerals having the same last 2 digits as their counterparts, and the descriptions for these components are omitted.

In the receiving screen 260, since no default value is provided with each of the setting items of "sort", "staple" and "punch", keys 261 to 267 are all in the unselected state, as shown in FIG. 16. Here, a value of null, indicating no variable value is provided, is assigned to the set value of each setting item.

If a touch on the "unset" key 261 for the setting item "sort", for example, is received on the receiving screen 260, a search is performed to retrieve setting value strings including at least a set value representing "unset" for the setting item "sort".

Other Particulars (1) Although particular details are not given in the above embodiment, a setting condition related to a higher-ranked executed job can be preferentially displayed in the case when the search for executed job settings is made based on set values of multiple setting items, which thereby facilitates the user's selection. The ranking may be decided based on, for example, the count of the same setting condition of executed jobs for the past one month (see FIG. 6).

(2) The above embodiment is described with an example of mode settings related to copying, however, mode settings for scanning and faxing can be realized in a similar manner.

(3) Although particular details are not given, the above embodiment displays only mode settings of executed jobs as recommended setting conditions. This is because mode settings, i.e. settings related to functional characteristics of the image forming apparatus, are versatile and readily reusable, and are also considered that there are no problems of security and privacy even if they are disclosed.

(4) Although, in the above embodiment, each of the MFPs 10, 20 and 30 has an executed job DB in its storage unit, an executed job DB may be provided in a storage unit of only one of the MFPs 10, 20 and 30 and managed centrally (here, one of the MFPs fulfills a search-server function). In the case where this structure is adopted, MFPs having no executed job DB transmit a search query to the MFP with an executed job DB and receive the search results.

In addition, an executed job DB may be centrally stored in the NAS 60, instead of in the storage units of the MFPs 10, 20 and 30.

(5) In the above embodiment, when receiving a selection from recommended setting conditions as shown in FIG. 11 (S206: Yes), the control unit 122 determines the selection as a setting condition for a new job (S207). However, instead of determining it immediately, the control unit 122 may reflect the selected setting condition to the receiving screen and continue the setting reception.

Herewith, the user is able to readily realize settings he/she desires based on recommended setting conditions for setting items.

(6) Although, in the above embodiment, the executed job DB is a database where setting details are organized for each setting condition of executed jobs (see FIG. 6), the present invention is not limited to this database structure.

(7) The image forming apparatus of the present invention can be adopted as a job setting support method, and furthermore adopted as a program causing a computer to realize the job setting support method. The program may be stored on computer-readable storage media, for example, optical recording media, such as magnetic disks including a magnetic tape and a flexible disk; a DVD; a CD-ROM; a CD-R; an MO; and a PD, and a flash memory recording medium such as Smart Media (registered trademark). The present invention may be implemented as recording media, and produced and transferred in such forms. Alternatively, the present invention may also be the computer program to be transmitted via networks, as represented by telecommunications, wire/wireless communications, and the Internet, or via satellite communications.

In addition, the above program does not necessarily include all modules for causing a computer to carry out the above-mentioned processes. Instead, each process of the present invention may be implemented by a computer by using various versatile programs that can be separately installed on an information processing apparatus—for example, communication programs and programs included in the operating system (OS). Accordingly, a recording medium of the present invention described above does not necessarily store therein all modules, and all the modules do not have to be transmitted. Furthermore, particular processing may be implemented using specialized hardware.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An image forming apparatus comprising:
a reception unit operable to receive a group of setting values for a plurality of setting items of a job from a user;
a storage unit storing therein a database that contains a plurality of groups of setting values and automatically storing, upon execution of a previous job, a group of setting values of the previous job in the database;
a search unit operable to search the database for extracting one or more groups of setting values from the groups of setting values contained in the database based on a setting value for at least one of the setting items of a present job received from the user;
a display control unit operable to display the one or more groups of setting values found by the search unit on a screen as one or more candidate setting conditions for the present job, a plurality of candidate setting conditions being displayed on the screen if the search unit finds two or more groups of setting values; and
a determining unit configured to allow a user to select one setting condition from the displayed one or more candidate setting conditions and to determine a group of setting values of the selected setting condition as setting values for the setting items of the present job.

2. The image forming apparatus of claim 1, wherein the search unit searches the database for one or more groups of setting values that include a setting value matching the received setting value.

3. The image forming apparatus of claim 1, wherein before the reception of the setting value from the user, a group of setting values of whose setting values are set to default, is assigned to the present job, and
the search unit starts the search when the received setting value is a value other than a default value.

4. The image forming apparatus of claim 1, wherein the setting values include a setting value related to post-processing performed on paper on which an image is formed, and
the search unit starts the search when the received setting value is a value associated with the setting value related to the post-processing.

5. The image forming apparatus of claim 1, wherein the reception unit receives the setting value from the user via a receiving screen displayed by the display control unit,
the reception of the setting value causes the search unit to start the search, and
in a case when the search unit finds one or more groups of setting values, the display control unit updates the receiving screen to display the found one or more groups of setting values.

6. The image forming apparatus of claim 1, wherein the setting values include a setting value related to a functional characteristic of image formation.

7. The image forming apparatus of claim 1 further comprising:
a connection unit operable to connect the image forming apparatus, via a network, to a different image forming apparatus including a storage unit storing therein a database matching the database of the image forming apparatus; and
a synchronous updating unit operable to synchronously update the database of the image forming apparatus with the database of the different image forming apparatus.

8. The image forming apparatus of claim 1, wherein
each of the plurality of groups of setting values contained in the database is associated with a search ranking thereof, and
in a case when the search unit finds two or more groups of setting values related to the received setting value, the display control unit preferentially displays one of the found groups of setting values that has a search ranking that is highest.

9. The image forming apparatus of claim 1, wherein
the display control unit displays a screen divided into a first display area and a second display area, the first display area including a receiving screen for receiving the setting value for the present job from the user, and the second display area showing the one or more groups of setting values found by the search unit as the candidate setting condition for the present job.

10. A job setting support method using a database that contains a plurality of groups of setting values, each of the groups of setting values corresponding to a group of setting values for a plurality of setting items that has been received through a reception unit and previously executed on an image forming apparatus, the job setting support method comprising the steps of:
automatically storing, upon execution of a previous job, a group of setting values of the previous job in the database;
receiving a group of setting values for a plurality of setting items of a present job through the reception unit from a user;
searching the database for extracting one or more groups of setting value from the groups of setting values contained in the database based on a setting value for at least one of the setting items of the present job received in the receiving step from the user;
displaying the one or more groups of setting values found in the searching step on a screen as one or more candidate setting conditions for the present job; and
allowing a user to select one setting condition from the displayed one or more candidate setting conditions and determining a group of setting values of the selected setting condition as setting values for the setting items of the present job.

11. The job setting support method of claim 10, wherein
the searching step searches for one or more groups of setting values that include a setting value matching the received setting value.

12. The job setting support method of claim 10, wherein
before the reception of the setting value from the user, a group of setting values of whose setting values are set to default, is assigned to the present job, and
the searching step starts the search when the received setting value is a value other than a default value.

13. The job setting support method of claim 10, wherein
the setting values include a setting value related to post-processing performed on paper on which an image is formed, and
the searching step starts the search when the received setting value is a value associated with the setting value related to the post-processing.

14. The job setting support method of claim 10, wherein
the receiving step involves receiving the setting value from the user via a receiving screen,
the searching step starts the search in response to the reception of the setting value, and
in a case one or more groups of setting values are found in the searching step, the displaying step updates the receiving screen to display the found one or more groups of setting values.

15. The job setting support method of claim 10, wherein
the setting values include a setting value related to a functional characteristic of image formation.

16. The job setting support method of claim 10, wherein
the database is stored in a storage unit of an image forming apparatus, and
the job setting support method further comprising:
connecting the image forming apparatus, via a network, to a different image forming apparatus including a storage unit storing therein a database matching the database of the image forming apparatus; and
synchronously updating the database of the image forming apparatus with the database of the different image forming apparatus.

17. The job setting support method of claim 10, wherein
each of the plurality of groups of setting values contained in the database is associated with a search ranking thereof, and
in a case when the searching step finds two or more groups of setting values related to the received setting value, the displaying step preferentially displays one of the found groups of setting values that has a search ranking that is highest.

18. The job setting support method of claim 10, wherein
the displaying step displays with a screen divided into a first display area and a second display area, the first display area including a receiving screen for receiving the setting value for the present job from the user, and the second display area showing the one or more groups of setting values found by the searching step as the one or more candidate setting conditions for the present job.

19. A computer-readable storage medium storing instructions for a job setting support method that uses a database that contains a plurality of groups of setting values, each of the groups of setting values corresponding to a group of setting values for a plurality of setting items that has been received through a reception unit and previously executed on an image forming apparatus, the instructions causing a computer to execute:
automatically storing, upon execution of a previous job, a group of setting values of the previous job in the database;
receiving a group of setting values for a plurality of setting items of a present job through the reception unit from a user;
searching the database for extracting one or more groups of setting values from the groups of setting values contained in the database based on a setting value for at least one of the setting items of the present job received from the user;
displaying the one or more groups of setting values found in the searching step on a screen as one or more candidate setting conditions for the present job; and
allowing a user to select one setting condition from the displayed one or more candidate setting conditions and determining a group of setting values of the selected setting condition as setting values for the setting items of the present job.

* * * * *